H. GRIFFITH.
BUFFER OR GUARD FOR AUTOMOBILES, &c.
APPLICATION FILED MAR. 12, 1914.
1,159,662.
Patented Nov. 9, 1915.
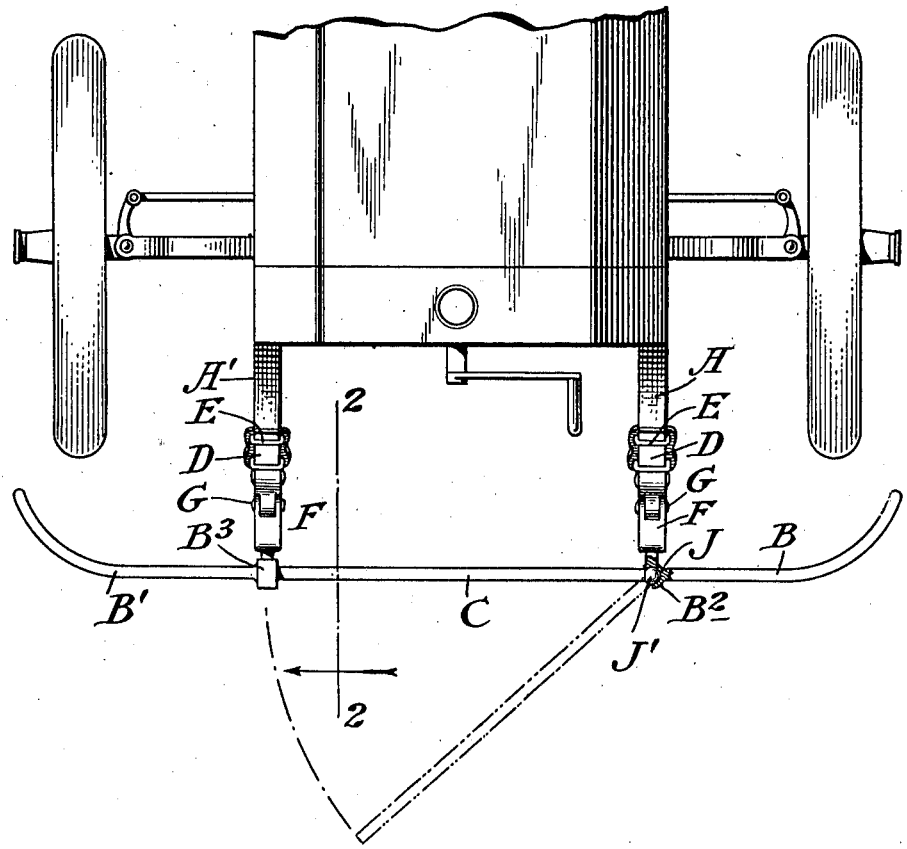
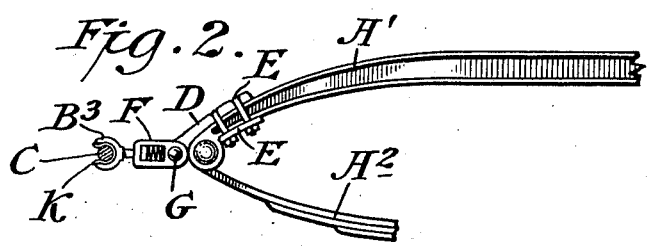
Witnesses:
A. R. Appleman
William H. Hawkins
Herbert Griffith
Inventor

UNITED STATES PATENT OFFICE.

HERBERT GRIFFITH, OF STAMFORD, CONNECTICUT.

BUFFER OR GUARD FOR AUTOMOBILES, &c.

1,159,662.   Specification of Letters Patent.   Patented Nov. 9, 1915.

Application filed March 12, 1914. Serial No. 824,332.

*To all whom it may concern:*

Be it known that I, HERBERT GRIFFITH, a citizen of the United States and resident of Stamford, in the county of Fairfield and State of Connecticut, have invented certain new and useful Improvements in Buffers or Guards for Automobiles, &c., of which the following is a specification.

This invention relates to buffers or guards for automobiles, auto-trucks, and other vehicles, and has for its object to provide a simple, serviceable and convenient device of this character which will effectively operate for the purposes intended, and yet permit access to the entire front of the radiator and adjacent portions of the automobile for cranking, cleaning, inspecting and repairing the car.

With these and other objects in view my invention consists in the novel construction and arrangement of device hereinafter fully described.

In the accompanying drawings: Figure 1 is a plan view of the forward portion of an automobile equipped with my invention. Fig. 2 is a section on the line 2—2 of Fig. 1.

My improved buffer or guard is preferably formed of tubular metal, of the usual or any approved shape. In common with most devices of this character, it is best mounted upon the forward ends A, A', of the automobile frame, where it joins the leaf springs $A^2$.

As shown in the drawings, the bar of my buffer or guard is formed in three parts, namely, two end sections B, B', and a central section C. The end sections B B' are segmentally curved as customarily and are attached to the front ends of A A' of the automobile frame.

The supports for the buffer or guard, by means whereof it is mounted upon the frame of the car, consist of the usual metallic strips, blocks, or arms D, clamped to the frame-ends A A' by clamps E, screwed up tight. These arms D carry forwardly-projecting preferably tubular casings or short cylinders F, shown open at the sides in Fig. 2, but usually closed. These casings F may either be secured tightly to the arms D or formed integral therewith, or they may be secured to the arms D by bolts or rivets G which may be tightened up and preclude upward movements of said casings under heavy impact of striking a body in a collision of the vehicle. Sometimes said bolts are tightened only to such degree as will allow a slight movement under heavy pressure, but while this may be done, I do not favor it. All of this structure of the supports is conventional or optional and forms no part of my invention except as a necessary factor in attachment of the device to the automobile.

The end sections B B' are formed with flanges $B^2$ $B^3$ or enlarged thickened inner ends, from which project rearwardly the pins or pistons H operating as ordinarily in the casings F, against the springs I, being retained therein by their heads H'. The flange $B^2$ of the end section B of the buffer as shown in Fig. 1 of the drawing, is hollowed out and formed with a socket J. The central section C of the buffer is formed with a ball J' fitted into said socket J of the end-section B, whereby it is pivoted therein and free to move in all directions. The flange $B^3$ of the opposite end section B' is formed into a sectionally-U-shaped socket or fork, in which is secured a similarly-shaped spring-clip K, adapted to receive the free end of the central section C when the same is forced or snapped thereinto, and hold it tightly in position.

The operation of the device will be readily understood from the foregoing description taken in connection with the drawings. In the normal or operative position of the buffer, it ranges in front of the automobile as do all other buffers, and in case of a collision with any either moving or stationary body the buffer takes the impact thereof, saves the front and accessories of the car from damage, prevents skidding by protecting the wheels against interference from the foreign body struck, and if the spring mounting is used as shown in the drawings, the buffer will yield a trifle under the pressure and oppose the resiliency of the springs to the remainder of the force of impact. In operation as thus described, it will be obvious that as the force of collision is of course against the outer face of the buffer, the pressure serves only more securely to press the central section C in place, not to detach the same, and that my buffer is perfectly effective for the purposes intended. It will also be noted while all impacts are largely against the front of the car, they may be directed partly downwardly, or upwardly, especially when a colliding body strikes one of the curved end sections B B' from one side, and my buffer is effectively resistant to all such shocks, from all directions, it requiring a direct thrust forwardly from the car-body to pull its central section out, and this is the one direction of force never existent in a collision.

In the ordinary operation of the car and the engine, the conventional buffer is always in the way. In cranking the car perhaps scores of times daily, the buffer interferes so greatly with convenience and facility of the cranking operation that many automobile operators will not use buffers in consequence. If you lean over the buffer, the crank may kick back in your face or a backfire may make you topple over from the constrained position assumed. If you step in between the buffer and the radiator, your leg is too close for freedom of motion, furthermore, you are very likely to have your knee struck by the crank, and if by error in leaving the clutch in, or its catching, the car starts to move as the engine revolves, you are helplessly trapped.

By the use of my invention, it is very simple to pull out the central section C, swing it outwardly over to one side, or slightly outwardly and upwardly to rest on the car, or downwardly to touch the ground, the ball and socket joint permitting it to be moved in all directions, or if a common hinge or pivot be used, it is merely swung forwardly out of the way. In cleaning or repairing the car, its radiator, or other parts, my buffer is also very handy and convenient, as access can be had fully and easily to the front of the car by simply pulling out the section C.

In describing the construction of my device shown in the drawings, I have referred not only to the essence of my invention, but to the known and selected mechanical expedients and parts indicated for effectively carrying it out, but my invention consists in the essential substance of the device, not in any of its specific mechanical means of attachment and mounting of the buffer or its parts.

Having thus fully described my invention, what I claim is:

1. A buffer or guard for automobiles and other vehicles provided with means for mounting it in front of the automobile, and having its central portion pivotally mounted so that it may be swung forwardly away from the front of the vehicle.

2. A buffer or guard of the character described, having the central portion thereof detachable at one end, and adapted to be moved away from the front of the vehicle.

3. A buffer or guard of the character described formed in sections, the central section being movable out of contact with the adjacent end section, whereby access may be had to the front of the vehicle.

4. A buffer or guard of the character described, formed in three sections, the end sections being provided with means for mounting them upon the front of the vehicle, and the central section being movable relatively to said end sections.

5. A buffer or guard of the character described, provided with a movably-mounted separate central section, and a spring socket to receive and retain the same.

6. A buffer or guard of the character described, provided with end sections, a pivotally mounted central section, and means for holding the central section in closed position.

7. A buffer or guard of the character described, comprising end sections provided with means for mounting them in position upon the front frame-ends of the automobile, a central section pivotally mounted at one end in one of the end-sections, and means upon the opposite end-section for receiving and retaining the free end of the said central section.

Signed at Stamford in the county of Fairfield and State of Connecticut this 11th day of March 1914.

HERBERT GRIFFITH.

Witnesses:
PERCY T. GRIFFITH,
JAMES E. BRINCKERHOFF.